United States Patent
Iyer et al.

(10) Patent No.: US 11,463,367 B1
(45) Date of Patent: Oct. 4, 2022

(54) METHODS AND SYSTEM FOR ADAPTIVELY MANAGING THE DISTRIBUTION OF NETWORK TRAFFIC

(71) Applicant: Versa Networks, Inc., San Jose, CA (US)

(72) Inventors: Sridhar Vishwanathan Iyer, Fremont, CA (US); Aswin Sivasubramanian, Milpitas, CA (US); Apurva Mehta, Cupertino, CA (US)

(73) Assignee: Versa Networks, Inc., San Jose, CA (US)

( * ) Notice: Subject to any disclaimer, the term of this patent is extended or adjusted under 35 U.S.C. 154(b) by 0 days.

(21) Appl. No.: 17/233,332

(22) Filed: Apr. 16, 2021

(51) Int. Cl.
  *H04L 47/2441* (2022.01)
  *H04L 47/263* (2022.01)
  *H04L 1/00* (2006.01)

(52) U.S. Cl.
  CPC ........ *H04L 47/2441* (2013.01); *H04L 1/0002* (2013.01); *H04L 47/263* (2013.01)

(58) Field of Classification Search
  CPC ..... H04L 47/2441; H04L 47/00; H04L 47/70; H04L 47/263
  See application file for complete search history.

(56) References Cited

U.S. PATENT DOCUMENTS

| | | | |
|---|---|---|---|
| 10,091,078 B2 | 10/2018 | Iyer et al. | |
| 10,523,570 B2 | 12/2019 | Iyer et al. | |
| 2012/0263120 A1* | 10/2012 | Gopalakrishnan | H04W 72/1226 370/329 |
| 2016/0127205 A1* | 5/2016 | Eastlake, III | H04L 43/04 370/252 |
| 2017/0324629 A1* | 11/2017 | Iyer | H04L 43/08 |
| 2020/0336932 A1* | 10/2020 | Jiang | H04L 43/0823 |

OTHER PUBLICATIONS

Cisco, "QoS: Policing and Shaping Configuration Guide, Cisco IOS XE Release 3S", updated Feb. 14, 2019, 262 pgs.
Cisco, "Cisco SD-WAN: Enabling Direct Internet Access", Solutions Adoption Prescriptive Reference: Design & Deployment Guide, Aug. 2020, 146 pgs.
Cisco, "Dynamic Multipoint VPN Configuration Guide, Cisco IOS Release 15M&T", updated Mar. 26, 2020, 218 pgs.

* cited by examiner

*Primary Examiner* — Mohamed A Kamara
(74) *Attorney, Agent, or Firm* — Loza & Loza, LLP

(57) ABSTRACT

Embodiments of methods and systems for managing traffic across a WAN are disclosed. A method involves advertising an input rate limit across a WAN from a first node, advertising an input distribution array across the WAN from the first node, wherein the input distribution array includes forwarding class-specific weights, and adapting at least one of the input rate limit and the input distribution array in response to an error between a target forwarding class distribution and an observed input traffic distribution.

20 Claims, 12 Drawing Sheets

*500*

```
system {
    sd-wan {
        adaptive-shaping {
            maximum-threshold    50;
            minimum-threshold    20;
            percent-change       10;
            poll-interval        5;
            dampening-count      1;
            enable               true;
        }
    }
}
```

```
org org1 {
    •••
    sd-wan {
        site {
            •••
            wan-interfaces {
                vni-0/0.0 {
                    circuit-name wan-link1;
                    local-id       1;
                    shaping-rate {
                        input-rate {
                            kbps 500000;
                        }
                        minimum-input-rate {
                            kbps 1000;
                        }
                    }
                }
            }
        }
    }
    •••
}
```

FIG. 6

METHODS AND SYSTEM FOR ADAPTIVELY MANAGING THE DISTRIBUTION OF NETWORK TRAFFIC

BACKGROUND

Modern businesses with distributed branches, such as banks or retail locations, are typically interconnected via an enterprise wide area network (WAN). The WAN can be implemented as a physical network or can be implemented in software (e.g., SD-WAN) and can consist of several hubs with each hub having hundreds or thousands of nodes. For example, an enterprise WAN of a bank might have an east coast hub to which hundreds of bank branches along the east coast are connected and a west coast hub to which hundreds of banks branches along the west coast are connected. An east coast bank branch connected to the east coast hub can forward data to other east coast bank branches or to west coast branches by routing data over the east coast hub and west coast hub. Because data is forwarded over hubs before being forwarded to branches, bandwidth limitations at the hubs can cause bottlenecks throughout the network.

SUMMARY

Embodiments of methods and systems for managing traffic across a WAN are disclosed. A method involves advertising an input rate limit across a WAN from a first node, advertising an input distribution array across the WAN from the first node, wherein the input distribution array includes forwarding class-specific weights, and adapting at least one of the input rate limit and the input distribution array in response to an error between a target forwarding class distribution and an observed input traffic distribution.

In an embodiment, adapting the input distribution array involves incrementing a forwarding class-specific weight of the input distribution array.

In an embodiment, adapting the input distribution array involves decrementing a forwarding class-specific weight of the input distribution array.

In an embodment, adapting the input distribution array involves calculating an error as: E=RMSE(Wn, Dn), where Wn=$w_0$/max(W); . . . $w_i$/max(W), and Dn=$d_0$/max(R), . . . $d_i$/max(R).

In an embodiment, the method further involves identifying the forwarding class with the highest individual error and adapting the corresponding forwarding class-weight. In an embodiment, the corresponding forwarding class-weight is incremented. In an embodiment, the corresponding forwarding class-weight is incremented by 1. In an embodiment, the corresponding forwarding class-weight is decremented. In an embodiment, the corresponding forwarding class-weight is decremented by 1.

In an embodiment, if the error is higher than the previous iteration, the forwarding class-weight is reverted to the previous value.

In an embodiment, the method involves identifying the forwarding class with the highest individual error and adapting the corresponding forwarding class-weight.

In an embodiment, adapting the input distribution array involves decrementing a forwarding class-specific weight of the input distribution array.

In an embodiment, adapting the input distribution array involves ordering Dn by individual error and adapting the forwarding class-weight with the greatest error.

In an embodiment, adapting the input distribution array involves calculating an error as:

$$E = \left( \frac{\sqrt{(w_0 - d_0)^2} + \sqrt{(w_1 - d_i)^2} + \sqrt{(w_2 - d_2)^2} + \sqrt{(w_3 - d_3)^2} \ldots \sqrt{(w_i - d_i)^2}}{i+1} \right);$$

where $w_i$ is the forwarding class-specific normalized weight and $d_i$ is the forwarding class-specific normalized input traffic distribution.

In an embodiment, the method involves identifying the forwarding class with the highest individual error and adapting the corresponding forwarding class-weight. In an embodiment, the corresponding forwarding class-weight is incremented. In an embodiment, the corresponding forwarding class-weight is decremented.

In another embodiment, a computing device for shaping traffic across a wide area network is disclosed, the computing device including a memory and processor, the memory including instructions that, when executed by the processor, cause the processor to perform steps including advertising an input rate limit across a WAN from a first node, advertising an input distribution array across the WAN from the first node, wherein the input distribution array includes forwarding class-specific weights, and adapting at least one of the input rate limit and the input distribution array in response to an error between a target forwarding class distribution and an observed input traffic distribution.

In another embodiment, a computer readable storage medium that stores computer readable instructions is dislcosed, which when executed by a processor, cause the processor to perform steps including advertising an input rate limit across a WAN from a first node, advertising an input distribution array across the WAN from the first node, wherein the input distribution array includes forwarding class-specific weights, and adapting at least one of the input rate limit and the input distribution array in response to an error between a target forwarding class distribution and an observed input traffic distribution.

Other aspects and advantages of embodiments of the present invention will become apparent from the following detailed description taken in conjunction with the accompanying drawings.

BRIEF DESCRIPTION OF THE DRAWINGS

FIG. 5 is an example configuration profile of a receiver node.

FIG. 6 is a further example of a configuration profile of a receiver node.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
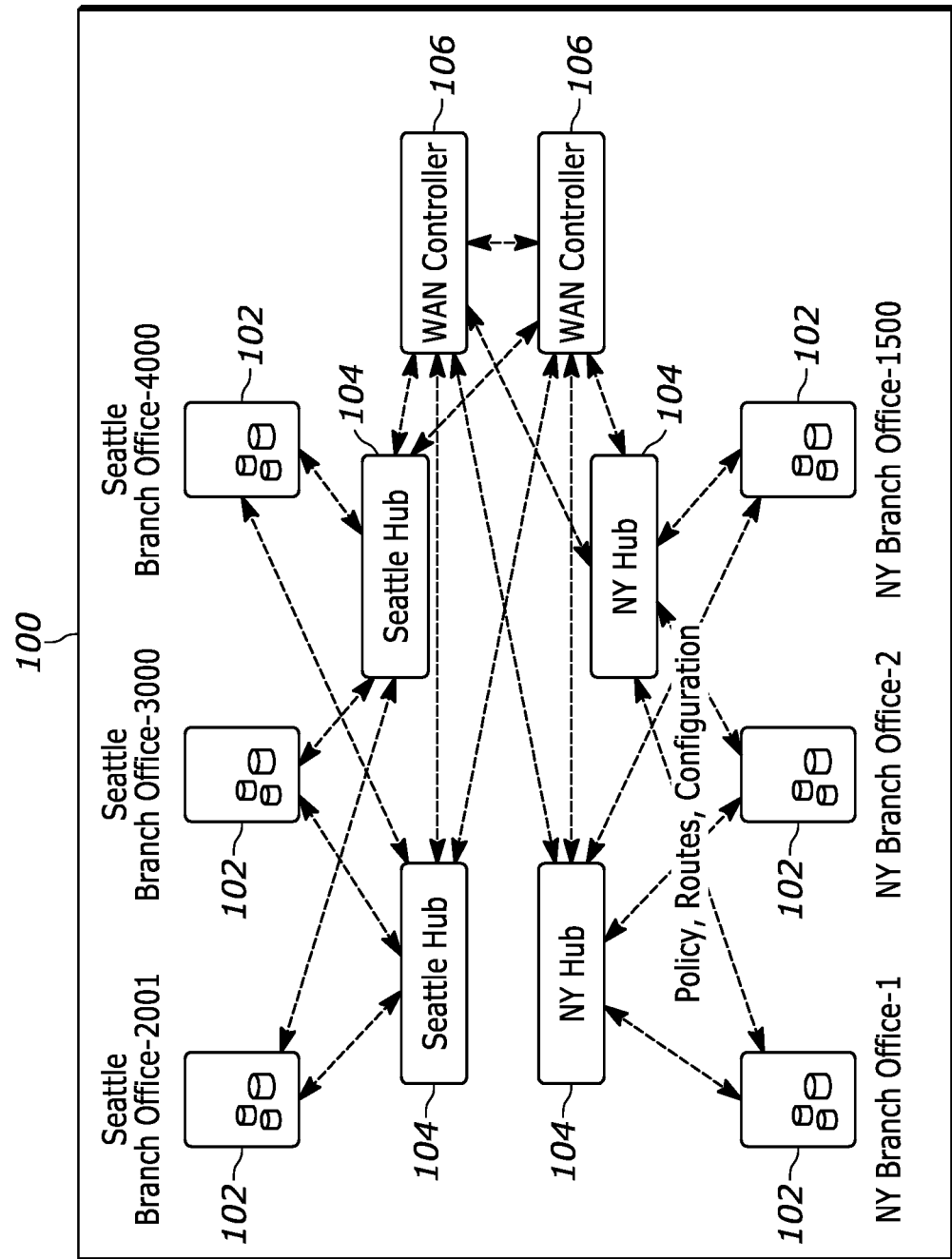
FIG. 1 illustrates a software-defined wide area network (SD-WAN).

FIG. 1 illustrates a software-defined wide area network (SD-WAN) 100. As illustrated, the SD-WAN includes multiple interconnected nodes 102, 104. Nodes can be configured to send data and to receive data transmissions. For simplicity of explanation herein, nodes from which data originates are referred to as "sender nodes" 102 and nodes that receive the data are referred to as "receiver nodes," but each node can be configured to send and receive data in practice. Nodes that interconnect sender nodes and forward data over an SD-WAN are referred to as "hubs" 104. "Hubs" are configured as gateways to an SD-WAN and are managed by SD-WAN controllers 106, which perform virtualization of WAN functionality. In order to provide redundancy, redundant hubs can be used and the nodes of the SD-WAN can be communicatively coupled using an NxN configuration (e.g., each node is coupled to every other node). For example, the node at Seattle Branch office-2001 is communicatively coupled to both Seattle hubs and can send data to either Seattle hub. A sender node can forward data to a recipient node in the SD-WAN by sending the data to a hub to which the sender node is communicatively coupled and the hub can forward the data along to a hub to which the recipient node is communicatively coupled. For example, in order to send data to New York Branch office-1, a node at Seattle Branch office-2001 would send data to one of the redundant Seattle hubs, the hub would forward the data to one of the redundant New York hubs as directed by an SD-WAN controller, and the New York hub would forward the data to a node at New York Branch office-1. In another embodiment, a node at Seattle Branch office-2001 is communicatively coupled to a node at New York Branch office-1 such that data can be sent directly from the node at Seattle Branch office-2001 to the node at New York Branch office-1 without being forwarded to a Seattle hub or a New York hub.

Figure 2A:
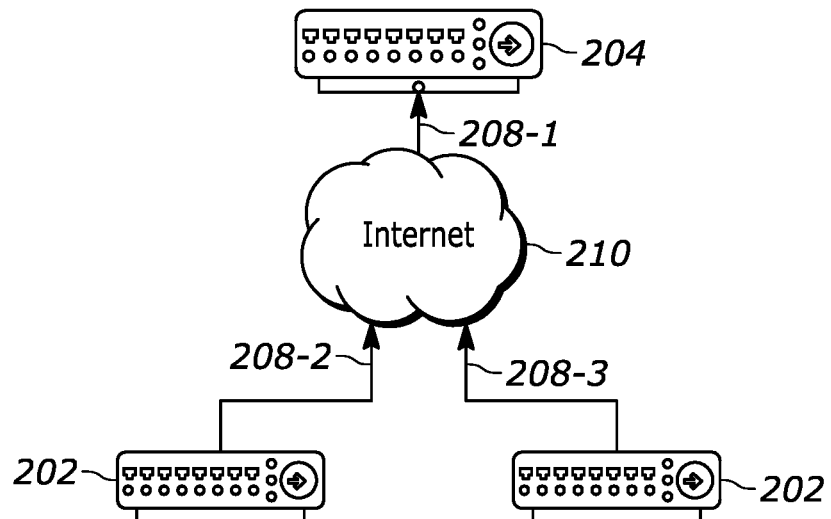
FIG. 2A illustrates two sender nodes communicatively coupled to a receiver node via the Internet.
Figure 2B:
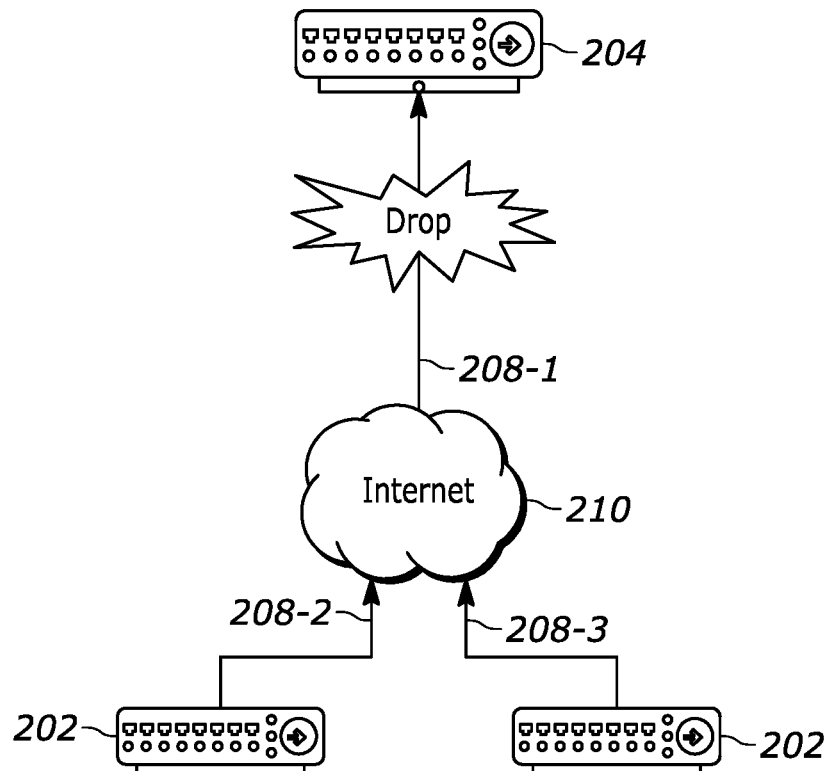
FIG. 2B illustrates a scenario in which the two sender nodes of FIG. 2A simultaneously uplink data at a maximum rate to the receiver node.

Multiple sender nodes can send data to a receiver node simultaneously. FIG. 2A illustrates two sender nodes 202 communicatively coupled to a receiver node 204 via the Internet 210. The illustrated configuration is an example of the connection configuration between branch offices and hubs as illustrated in FIG. 1. In FIG. 2A, each node is configured with an uplink and/or downlink connection 208-1, 208-2, and 208-3. An uplink is a connection from a node to a WAN cloud (e.g., via the Internet) and a downlink is a connection from the WAN cloud to the node. A connection can be both an uplink and a downlink if bi-directional data flow is supported. For example, the connections between nodes in FIG. 2A can facilitate traffic flowing from the sender nodes to the receiver node as well as from the receiver node to the sender nodes. In FIG. 2A, if data is sent from the sender nodes to the receiver node (as indicated by the arrows), then the receiver node must have sufficient bandwidth to receive the data or else the data will be dropped. For example, FIG. 2B illustrates a scenario in which the two sender nodes 202 of FIG. 2A simultaneously send data to the receiver node 204. The uplink and downlink connections 208-1, 208-2, 208-3 each have a 1 Gb bandwidth. If both sender nodes send data at a rate of 1 Gbps (e.g., the maximum rate given their bandwidth), then the receiver node would need a 2 Gb connection to receive all of the data. However, because the receiver node only has a 1 Gb connection, data in excess of 1 Gb will be dropped. When data is dropped, a sender node may attempt to re-send the dropped data thus further exacerbating the problem. In other circumstances, where a sender node has a data quota, re-sending the dropped data may not be possible if the data quota is already met.

To prevent data from being dropped, a known solution is to place nodes in groups and create a policy that defines and limits a maximum threshold at which bandwidth can be used to be applied to the group. However, a node needs to be placed in a group before a policy can be applied to the node, which prevents automatic management (e.g., limiting bandwidth usage) of nodes as the nodes join the SD-WAN.

An alternative known solution to prevent data from being dropped is to apply bandwidth shaping on a local egress interface of a node. However, shaping on a local egress interface requires additional processing by a node and, because the shaping is performed by a node independent of other nodes, coordinated shaping among nodes coupled to the same hub is not possible.

Another solution involves advertising a data rate limit across a WAN from a first node, measuring the rate of data received at a WAN interface of the first node, and, if the measured rate of data received at the WAN interface of the first node exceeds a maximum threshold, advertising a reduced data rate limit across the WAN, and, if the measured rate of data received at the WAN interface of the first node is below a minimum threshold, advertising an increased data rate limit across the WAN. For example, when a receiver node (e.g., a first node) initializes, the receiver nodes advertises a data rate limit across a WAN to second nodes, such as sender nodes communicatively coupled to the receiver node. In an embodiment, nodes can be directly coupled to each other and, thus, a node can transition between being a sender node and a receiver node in accordance with the flow of traffic. Once data is being received from the sender nodes, the receiver node measures its own bandwidth usage at its WAN interface and advertises a reduced data rate limit or an increased data rate limit as needed. Because the first node is measuring its own bandwidth utilization, the first node can take the rate at which it is receiving data from all nodes communicatively coupled to the first node into consideration when determining a data rate limit to advertise. For example, rather than just arbitrarily advertising a data rate limit that is half of the downlink rate of the first node to three connected nodes, the first node can advertise a data rate limit that is an equal division of the total downlink capacity of the first node to each other node (e.g., one third of the total downlink capacity). Additionally, when a second node is initialized and communicatively coupled to the first node, the first node can advertise the data rate limit directly to the second node. For example, when a new sender node (e.g., a second node) is communicatively coupled to the receiver node, the new sender node will not know the advertised data rate limit for the receiver node. The receiver node can advertise the data rate limit directly to the new sender node. Accordingly, the new sender node can be initialized without first adding the new sender node to a group and applying a policy (e.g., as in known techniques). In another embodiment, the advertisement of the data rate limit to the new sender hub is triggered when the receiver node receives an initial data transmission from the new sender node. Thus, the receiver node does not need to consume bandwidth to advertise the data rate limit until the new sender node begins sending data.

Figure 3:
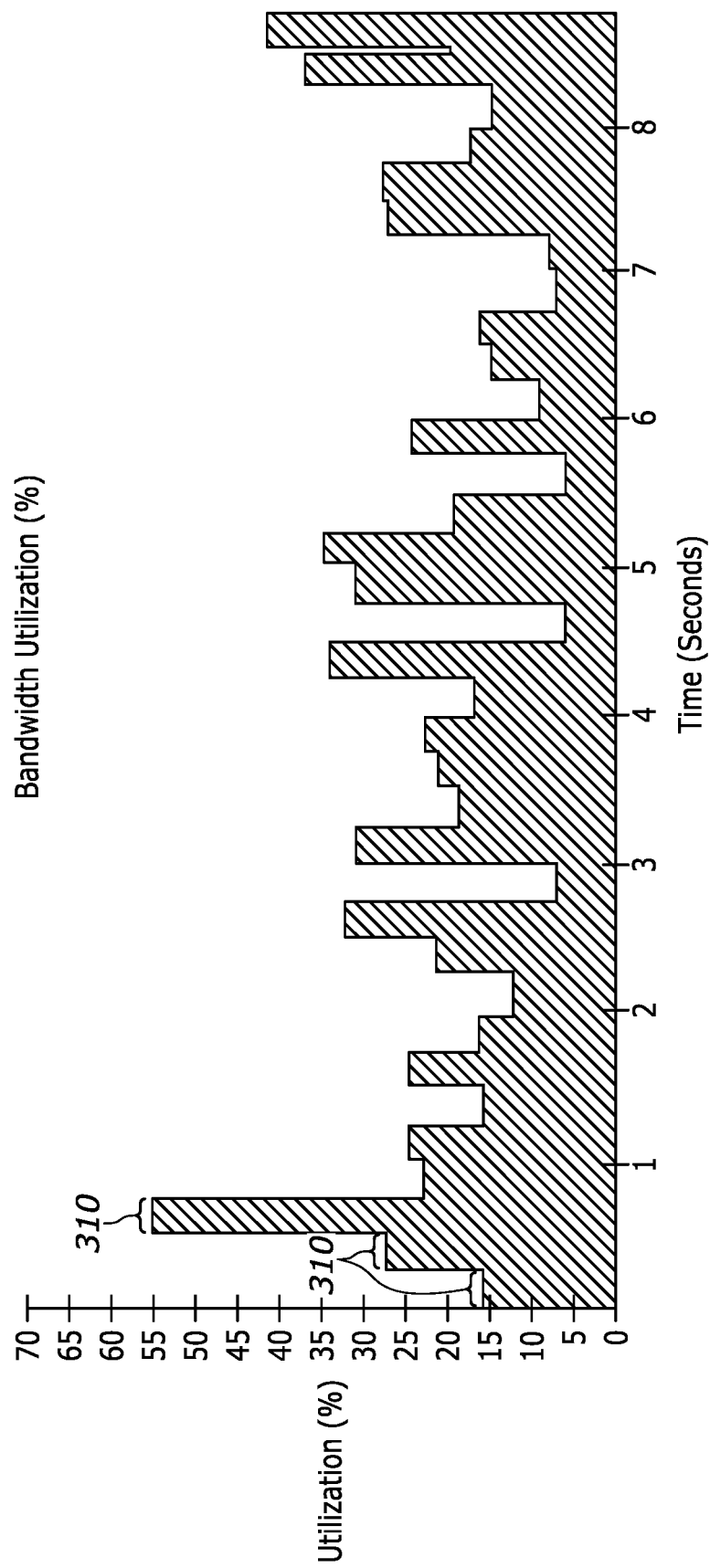
FIG. 3 is a graph of bandwidth utilization recorded by measuring the rate of data received at a WAN interface.

FIG. 3 is a graph of bandwidth utilization 300 recorded by periodically measuring the rate of data received at a WAN interface. In an embodiment, the rate of data can be measured and recorded on a defined interval 310. For example, in FIG. 3, four measurements are recorded per second. To dampen a measurement, measurements over several consecutive intervals can be averaged together to determine a dampened measurement. The number of intervals averaged together can be defined by setting a dampening count. For example, in FIG. 3, to dampen measurements over one second intervals, the damping count would be set to four.

Figure 4A:
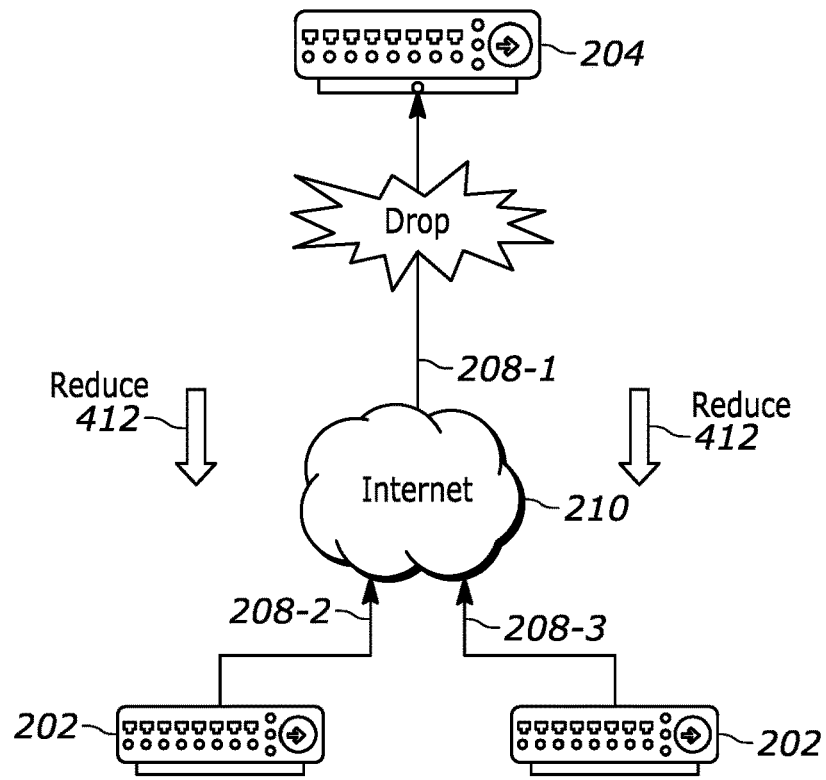
FIG. 4A illustrates the scenario of FIG. 2B in which the receiver node has been modified to advertise a reduced data rate limit when a measured rate of data received by the WAN interface of the receiver node exceeds a maximum threshold.

FIG. 4A illustrates the scenario of FIG. 2B in which the receiver node 204 has been modified to advertise a reduced data rate limit 412 when a measured rate of data received by the WAN interface of the receiver node (not shown) exceeds a maximum threshold. In the scenario of FIG. 4A, the sender nodes are each a "second node" as described in accordance with the technique for shaping traffic across a WAN. In an embodiment, the maximum threshold can be defined by a user as a fixed rate (e.g., 312 kbps), as a percentage of the total bandwidth utilization (e.g., 50%), as a percent change from the current data rate limit (e.g., a 5% reduction), or by other techniques for defining a threshold. If both sender nodes 202 send data at a maximum rate, then the combined data will exceed the bandwidth of the connection of the receiver node. Accordingly, the receiver node advertises a reduced data rate limit to the sender nodes. When the rate of data received is measured again, if the rate of data received still exceeds the maximum threshold, then the receiver node can advertise an even more reduced data rate limit to the sender nodes. The receiver node can continue to further reduce the advertised data rate limit until the rate of data received no longer exceeds the maximum threshold.

Figure 4B:
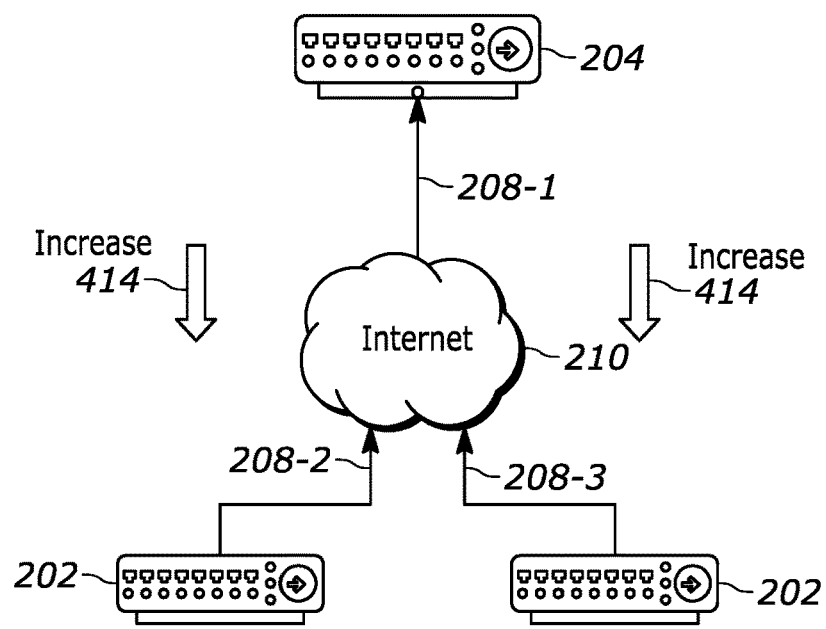
FIG. 4B illustrates the scenario in which the measured rate of data received at the WAN interface of a receiver node is below a minimum threshold.

Alternatively, if the rate of data received is measured and falls below a minimum threshold, then the receiver node can advertise an increased data rate limit to the sender nodes until the rate of data received exceeds the maximum threshold again (or until the data rate limit returns to a maximum amount equal to one hundred percent of downlink). FIG. 4B illustrates the scenario in which the measured rate of data received at the WAN interface of a receiver node (not shown) is below a minimum threshold. If both sender nodes 202 are sending data, but the combined data rate limit is less than the minimum threshold, then the receiver node 204 advertises an increased data rate limit 414 to the sender nodes. When the rate of data received is measured again, if the sender nodes are still not sending at a rate in excess of the minimum rate, then the receiver node advertises a further increased data rate limit to the sender nodes. The receiver node can continue to further increase the data rate limit until the rate of data received is either no longer below a minimum threshold or the data rate limit cannot be further increased (e.g., when the data rate limit has been raised to one hundred percent of the connection).

Before advertising a data rate limit, connection properties and a data rate limit can be configured at a receiver node. FIG. 5 is an example of the configuration profile 500 at a receiver node. The configuration profile includes, a maximum threshold, a minimum threshold, a percent change, a poll interval, a dampening count, and an enable variable. The maximum threshold sets the value or percentage of a downlink connection of the receiver node that can be in use before advertising of a reduced data rate limit occurs. In the example of FIG. 5, when 50% or more of the downlink connection of the receiver node is in use, advertising of a reduced data rate limit occurs. The minimum threshold sets the value or percentage of the downlink connection of the receiver node that must be in use. If usage drops below the minimum threshold, advertising of an increased data rate limit occurs. In the example of FIG. 5, if usage drops below 20%, then advertising of an increased data rate limit occurs. The percent change defines the increment by which the advertisement increases or reduces the data rate limit. In the example of FIG. 5, if a data rate limit needs to be advertised, the advertised data rate limit will be a 10% change from the current data rate limit. The poll interval sets the frequency with which the rate of data received is measured. In the example of FIG. 5, the poll interval is set to five and so the rate of data received is measured on five second intervals. The damping count is the number of poll intervals to wait before determining if the rate of data received exceeds the maximum threshold or is below the minimum threshold. In the example of FIG. 5, the damping count is set to one so a single measurement where the rate of data received exceeds the maximum threshold or is below the minimum threshold would trigger advertising of a new data rate limit. The enable variable allows for the above described technique to be turned on or turned off. In the example of FIG. 5, the enable variable is set to true so the technique is enabled.

When a receiver node determines a data rate limit, the receiver node communicates the data rate limit to sender nodes. In an embodiment, the data rate limits can be communicated using an extension of a Border Gateway Protocol (BGP) in BGP notification messages. FIG. 6 is a further example of a configuration profile 600 of a receiver node. In the example, a link on a WAN interface is identified (e.g., vni-0/0.1) and a maximum threshold and a minimum threshold are communicated. In the example of FIG. 6, the maximum threshold is communicated as an input-rate of 500 mbps (500,000 kbps) and the minimum threshold is communicated as a minimum input rate of 1 mbps (1000 kbps).

Figure 7:
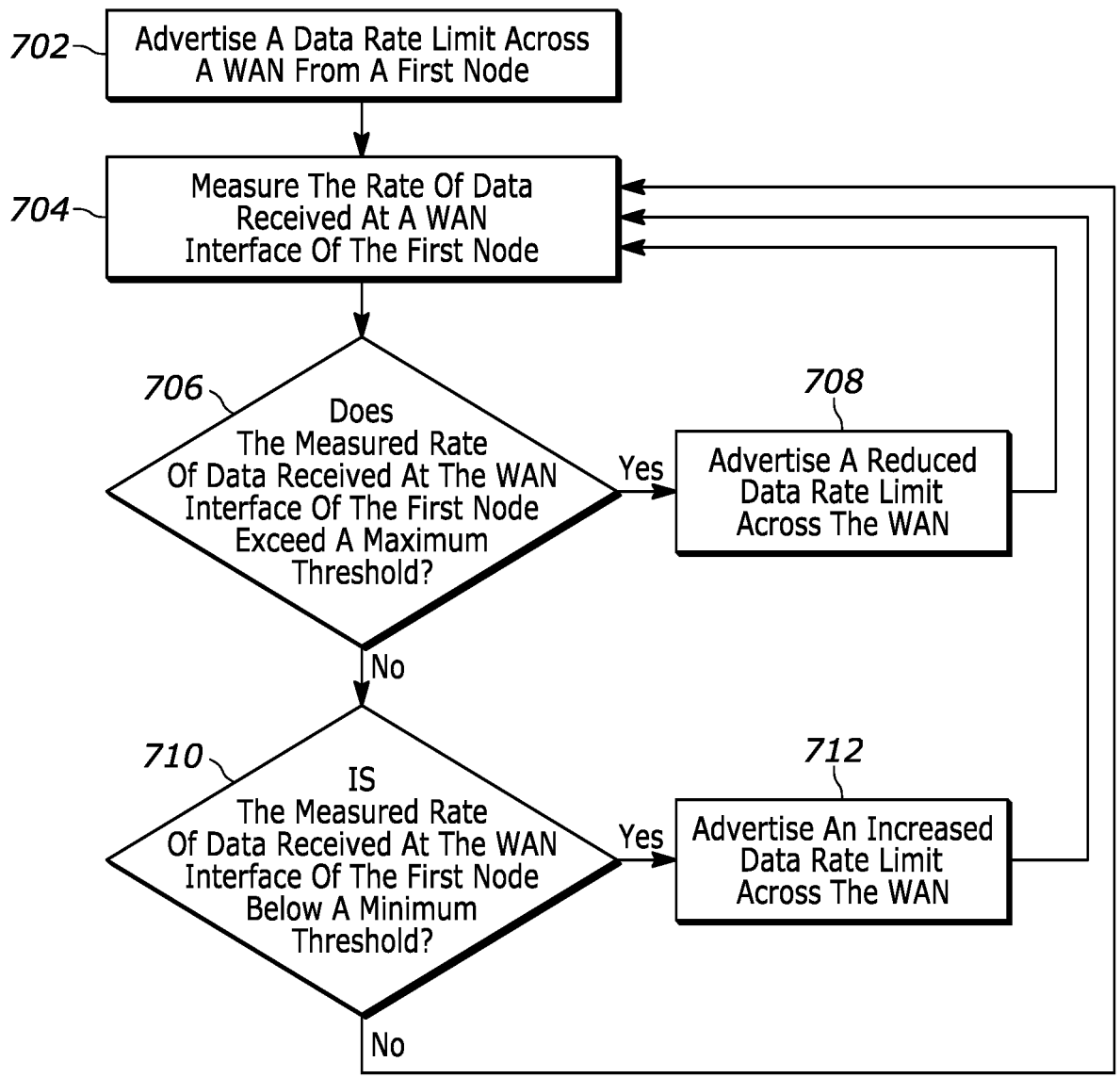
FIG. 7 is a flow chart diagram of a method for shaping traffic across a wide area network.

FIG. 7 is a flow chart diagram of a method for shaping traffic across a wide area network. At block 702, a data rate limit is advertised across a WAN from a first node. In an embodiment, the data rate limit is advertised as a rate at which data can be received and is a predefined value. At block 704, the rate of data received at a WAN interface of the first node is measured. In an embodiment, the rate of data received at a WAN interface of the first node is measured on a defined interval and can be measured on a per tenant basis. In another embodiment, a measurement of the rate at which data can be received is determined by a plurality of consecutive measurements. At decision point 706, if the measured rate of data received by the WAN interface of the first node exceeds a maximum threshold, then, at block 708, a reduced data rate limit is advertised across the WAN. In an embodiment, the reduced data rate limit is advertised as a percent change from the data rate limit and can be advertised to all nodes communicatively coupled to the first node at once. For example, if two nodes are communicatively coupled to the first node, then a notification can be sent to both nodes simultaneously advertising the reduced data rate limit. If, at decision point 706, the measured rate of data received at the WAN interface of the first node does not exceed a maximum threshold, then the technique moves to decision point 710. At decision point 710, if the measured rate of data received at the WAN interface of the first node is not below a minimum threshold, the technique can return to block 704 or wait a period of time (e.g., a period of time defined by the poll interval of FIG. 5) and, if the measured rate of data received by the WAN interface of the first node is below a minimum threshold, then, at block 712, an increased data rate limit is advertised across the WAN. In an embodiment, the increased data rate limit is advertised as a percent change from the data rate limit and can be advertised to all nodes communicatively coupled to the first node at once.

As described above, a node in an SD-WAN can measure the rate at which traffic is being received (e.g., its bandwidth) utilizing an input interface and can use rate limit advertisements to shape traffic that is received from other nodes in the SD-WAN. While this technique works well to shape the total amount of traffic that is received at a node in the SD-WAN, there may be a desire to also control the distribution of traffic that is received at the node on a per-forwarding class basis. Additionally, in a large SD-WAN with multiple nodes, it may be desirable to manage the volume and distribution of SD-WAN traffic at a node without having to monitor flow states at the other nodes in the SD-WAN.

Figure 8A:
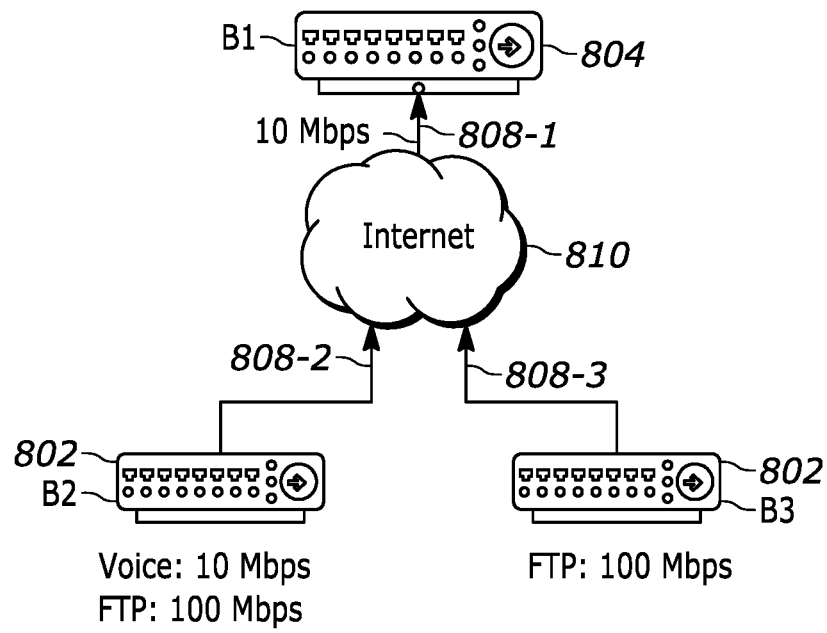
FIG. 8A-8C illustrates two sender nodes communicatively coupled to a receiver node via a WAN such as the Internet.

An example of a technique for managing the distribution of traffic in an SD-WAN is described with reference to FIGS. 8A-10. FIG. 8A illustrates two sender nodes, B2 and B3, 802 communicatively coupled to a receiver node, B1, 804, via a WAN such as the Internet, 810. In the example of FIG. 8A, the receiver node, B1, and the two sender nodes, B2 and B3, are connected as an SD-WAN as described, for example, with reference to FIG. 1. In the example of FIG. 8A, the maximum bandwidth supported on the uplink connection 808-1 between the Internet and the receiver node, B1, is 10 Mbps and although not specified, it is assumed that the maximum bandwidth supported on the uplink connections between sender nodes, B2 and B3, 808-2 and 808-3, and the Internet is at least 10 Mbps. As shown in FIG. 8A, sender node, B2, generates 10 Mbps of voice traffic and 100 Mbps of File Transfer Protocol (FTP) traffic and sender node, B3, generates 100 Mbps of FTP traffic. Voice traffic and FTP traffic are considered as two different forwarding classes amongst a range of different forwarding classes.

Although voice traffic and FTP traffic are identified as two different forwarding classes, it should be understood that other forwarding classes are possible, including, for example, forwarding classes that correspond to the type of traffic, e.g., voice, video, application-specific traffic, etc. Additionally, forwarding classes may be defined in terms of priority or quality of service, such as high priority, medium priority, low priority, assured delivery, and best effort. In some instances, it may be desirable for the receiver node, B1, 804, to specify a desired distribution of the quantity of received traffic by forwarding class. For example, the receiver node, B1, may desire to receive voice and FTP traffic at a distribution ratio of 2:3, that is, two parts of voice traffic for every three parts FTP traffic. In an embodiment, the quantity of received traffic is measured in terms of the rate at which traffic is received in, for example, megabits per second (Mbps).

In an embodiment, the receiver node, B1, 804, initially advertises a rate limit of 10 Mbps to the sender nodes, B2 and B3, 802. However, if traffic in excess of the 10 Mbps rate limit is received at the receiver node, B1, the receiver node may begin to shape the traffic through, for example, rate limit advertisements. For example, in an attempt to shape traffic that is received at the receiver node, B1, the receiver node may advertise a rate limit and a forwarding class distribution ratio to other nodes connected through the SD-WAN, e.g., to sender nodes, B2 and B3, 802. For example, in view of the 10 Mbps maximum bandwidth capability on the uplink connection 808-1 from the Internet, 810, to the receiver node, B1, the receiver node may advertise a rate limit of 5 Mbps to the sender nodes, B2 and B3. Additionally, the receiver node, B1, may advertise a target distribution of voice-to-FTP traffic as a ratio of 2:3.

Figure 8B:
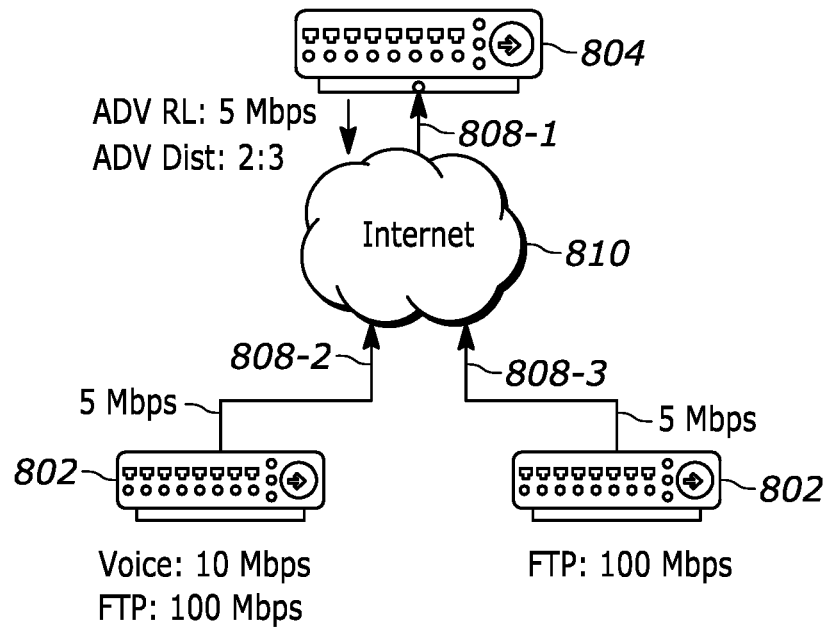

FIG. 8B illustrates the receiver node, B1, 804, advertising a rate limit of 5 Mbps and a distribution ratio of 2:3 (voice:FTP) to the sender nodes, B2 and B3, 802, in the SD-WAN. As illustrated in FIGS. 8A and 8B, sender node, B2, generates 10 Mbps of voice traffic and 100 Mbps of FTP traffic while sender node, B3, generates 100 Mbps of FTP traffic. Because both sender nodes, B2 and B3, are constrained by a 5 Mbps rate limit and a 2:3 distribution ratio of voice-to-FTP traffic, sender node, B2, will be limited to transmit 2 Mbps of voice traffic and 3 Mbps of FTP traffic and sender node, B3, will be limited to transmit 3 Mbps of FTP traffic. The distribution of sent traffic is summarized in Table 1.

TABLE 1

| Sender Node B2 Rate Limit: 5 Mbps | Sender Node B3 Rate Limit: 5 Mbps | Total traffic | Distribution Ratio (voice:FTP) |
|---|---|---|---|
| 2 Mbps voice 3 Mbps FTP | 0 Mbps voice 3 Mbps FTP | 2 Mbps voice 6 Mbps FTP | Target: 2:3 Advertised: 2:3 Actual: 2:6→1:3 |

As shown in Table 1, a combined total of 2 Mbps of voice traffic and a combined total of 6 Mbps of FTP traffic are sent by the sender nodes, B2 and B3, 802, such that the combined total of traffic sent (and assumed to be received at the receiver node, B1) is 8 Mbps. While the total amount of traffic received at receiver node, B1, 804, is within the maximum supported bandwidth of the uplink connection 208-1 of 10 Mbps, the actual distribution ratio of voice-to-FTP is 1:3, which is different from the target distribution ratio of 2:3.

Figure 8C:
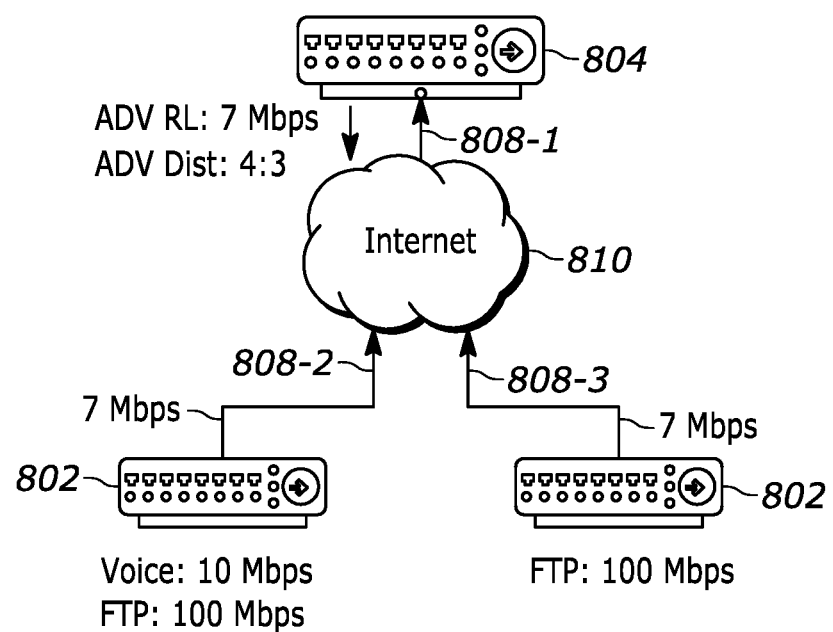
Figure 9:
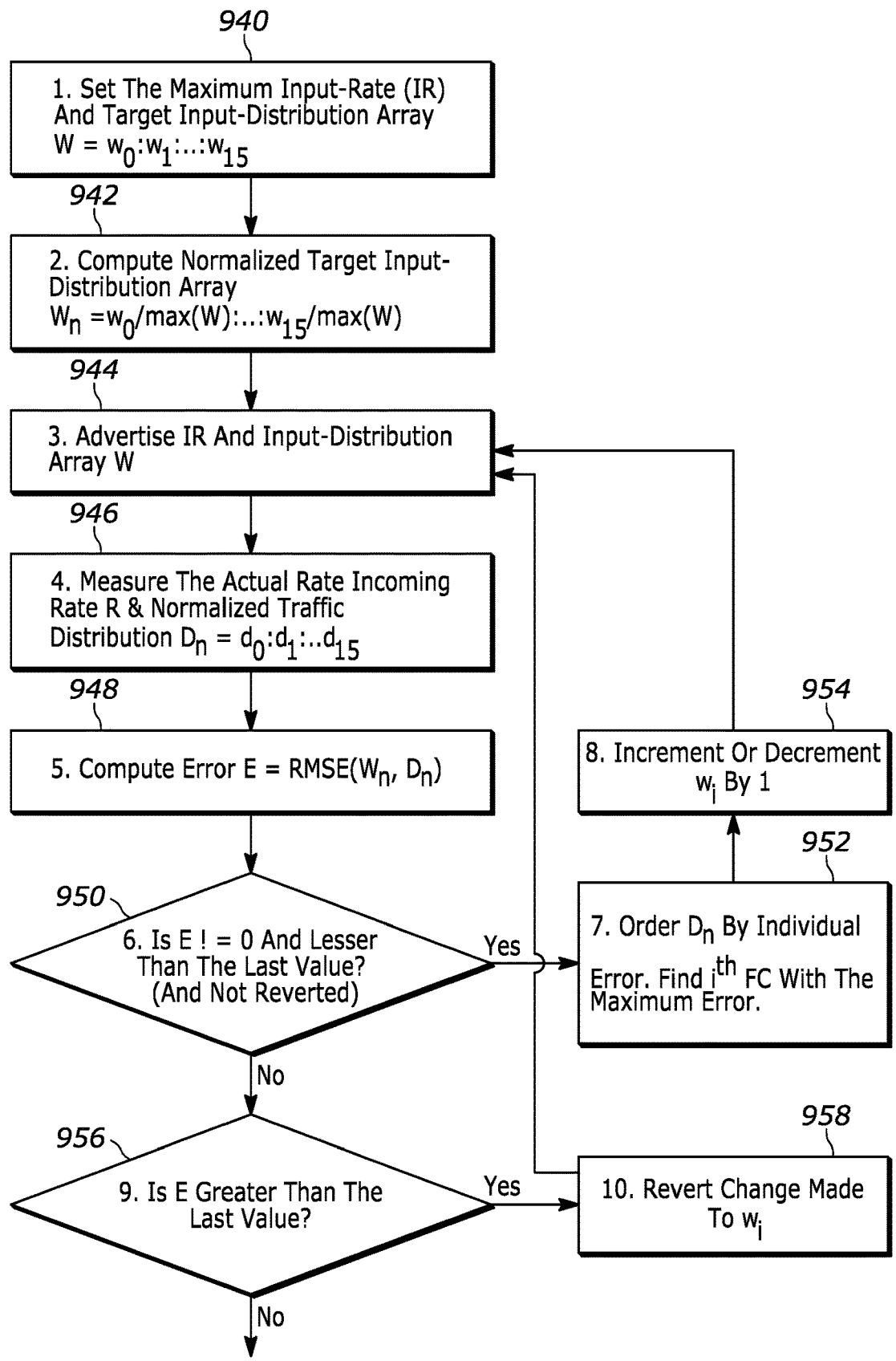
FIG. 9 is a process flow diagram of a method for managing traffic across a WAN.

When the target constraints of a receiver node (e.g., receiver node, B1, 804), are not being met, it may be possible to better meet the target constraints by adjusting at least one of the constraints, e.g., the rate limit and/or the forwarding class distribution ratio, that is advertised to the sender nodes, e.g., to sender nodes, B2 and B3, 802. For example, in the scenario described with reference to FIG. 8B, the advertised rate limit may be changed from 5 Mbps to 7 Mbps and the advertised distribution ratio may be changed from 2:3 (voice:FTP) to 4:3 (voice:FTP). Note that while the advertised distribution ratio has changed from 2:3 to 4:3, the target distribution ratio is still 2:3. FIG. 8C illustrates the receiver node, B1, advertising a rate limit of 7 Mbps and a distribution ratio of 4:3 (voice:FTP) to the sender nodes B2 and B3, in the SD-WAN. As illustrated in FIGS. 8A-8C, sender node, B2, still generates 10 Mbps of voice traffic and 100 Mbps of FTP traffic and sender node, B3, still generates 100 Mbps of FTP traffic. However, because both sender nodes, B2 and B3, are now constrained by a 7 Mbps rate limit and a 4:3 distribution ratio of voice-to-FTP traffic, sender node, B2, will be limited to transmit 4 Mbps of voice traffic and 3 Mbps of FTP traffic and sender node, B3, will be limited to transmit 3 Mbps of FTP traffic. The new distribution of sent traffic is summarized in Table 2.

TABLE 2

| Sender Node B2 Rate Limit: 7 Mbps | Sender Node B3 Rate Limit: 7 Mbps | Total traffic | Distribution Ratio (voice:FTP) |
|---|---|---|---|
| 4 Mbps voice 3 Mbps FTP | 0 Mbps voice 3 Mbps FTP | 4 Mbps voice 6 Mbps FTP | Target: 2:3 Advertised: 4:3 Actual: 4:6→2:3 |

As shown in Table 2, the total amount of voice traffic received at the receiver node, B1, 802, is 4 Mbps and the total amount of FTP traffic received at receiver node, B1, is 6 Mbps, such that the combined total amount of received traffic is 10 Mbps. Thus, not only is the combined total amount of traffic received at receiver node, B1, within the maximum supported bandwidth of the uplink connection (e.g., 10 Mbps), but the distribution ratio of voice-to-FTP is now 2:3 (voice:FTP), which is the same as the target distribution ratio of 2:3 (voice:FTP).

While it has been shown from the example above that there is a combination of an advertised rate limit and an advertised distribution ratio that will meet the target rate limit and target distribution ratio, finding a particular combination of advertised rate limit and advertised distribution that will meet the target rate limit and target distribution ratio is not a trivial task. A technique for finding and maintaining a particular combination of advertised rate limit and advertised distribution ratio that will meet a target rate limit and a target distribution ratio involves advertising an input rate limit and a distribution array across a WAN and adapting the input rate limit and/or distribution array in response to an error between a target forwarding class distribution and an observed input traffic distribution. An example of the technique is described with reference to FIG. 9.

At block 940, an input rate (e.g., a rate limit) and a target input distribution are set in a receiver node of an SD-WAN. In an embodiment, the input rate is set as a maximum input rate of the traffic that should be received on an interface of the receiver node, for example, 10 Mbps at receiver node, B1 and the target input distribution is set as a target distribution array of forwarding class-specific weights. For example, a distribution of 16 different forwarding classes is represented as a set of integer forwarding class-specific weights as:

$W=w0:w1:w2:w3:w4:w5:w6:w7:w8:w9:w10:w11:w12:w13:w14:w15;$ and an example array, W, of the actual weights is: W=1, 5, 1, 2, 1, 4, 1, 2, 1, 3, 1, 1, 1, 1, 1, 1

At block 942, the target input distribution array, W, is normalized as:

$Wn=w0/max(W):w1/max(W):w2/max(W):w3/max(W): \ldots :w15/max(W);$ where max(W) is the highest weight amongst the set of weights.

In the case of the example above, the normalized input distribution array, Wn, is expressed as:

$Wn=1/5:5/5:1/5:2/5:1/5:4/5:1/5:2/5:1/5:3/5:1/5:1/5:1/5:1/5:1/5:1/5;$ or in decimal form as:

$Wn=.2:1:.2:.4:.2:.8:.2:.4:.2:.6:.2:.2:.2:.2:.2:.2.$

At block 944, the input rate limit, IR, and the input distribution array, W, are advertised by a receiver node (e.g., receiver node, B1) to sender nodes (e.g., sender nodes, B2 and B3) in an SD-WAN.

At block 946, the actual incoming rate, R, of traffic at the receiver node (e.g., receiver node, B1) is measured at an interface of the receiver node (e.g., receiver node, B1) and a normalized traffic distribution is calculated on a per-forwarding class basis, where the forwarding classes correspond to the forwarding classes of the input distribution array, W. For example, the normalized traffic distribution is expressed as:

$Dn=d0:d1:d2:d3:d4:d5:d6:d7:d8:d9:d10:d11:d12:d13:d14:d15;$ and is calculated as:

$$D_n = r0/\max(R){:}r1/\max(R){:}r2/\max(R){:}r3/\max(R){:}\ldots{:}r15/\max(R);$$

where $r_i$ is the rate of a particular forwarding class and max(R) is the highest rate amongst all of the forwarding classes.

At block 948, an error is computed. In an embodiment, the error is calculated as an error between a target forwarding class distribution and an observed input (received) traffic distribution. In an embodiment, the error is calculated as a root mean square error, RMSE as:

E=RMSE(Wn, Dn), which in one example can be expressed as:

$$E = \left( \frac{\sqrt{(w_0 - d_0)^2} + \sqrt{(w_1 - d_i)^2} + \sqrt{(w_2 - d_2)^2} + \sqrt{(w_3 - d_3)^2} \ldots \sqrt{(w_{15} - d_{15})^2}}{16} \right);$$

which can be more generally expressed as:

$$E = \left( \frac{\sqrt{(w_0 - d_0)^2} + \sqrt{(w_1 - d_i)^2} + \sqrt{(w_2 - d_2)^2} + \sqrt{(w_3 - d_3)^2} \ldots \sqrt{(w_i - d_i)^2}}{i+1} \right);$$

where $w_i$ is the forwarding class-specific normalized weight and $d_i$ is the forwarding class-specific normalized input traffic distribution, where i is an integer of greater than 1.

At decision point 950, it is determined if the error is not equal to zero and is less than the previously calculated error. If it is determined that the error is not equal to zero and is less than the previously calculated error, then the process proceeds to block 952. In an embodiment, if the new error, E, is greater than the earlier error, the advertised rate or distribution ratio can be reverted to the earlier value to prevent the error from getting worse.

At block 952, the normalized traffic (Dn) is ordered by magnitude of the error to determine the forwarding class with the highest error. For example, the forwarding class-specific error is calculated as $(w_i - d_i)^2$. Although the forwarding class error is calculated as $(w_i - d_i)_2$ in the this example, other ways of calculating the error are possible.

Once the error is ordered by magnitude, at block 954, the forwarding class-specific weight, $w_i$, that corresponds to the forwarding class with the highest error is adapted (e.g., incremented or decremented). For example the forwarding class-specific weight, $w_i$, is incremented or decremented by 1. In an embodiment, the criteria for adapting (e.g., incrementing or decrementing) a forwarding class weight is:

if $w_i$<target $w_i$→increment; and
if $w_i$>target $w_i$→decrement;
where the target $w_i$ is the target forwarding class-specific weight that is set at the receiver node, where i is an integer greater than 1.

Once the forwarding class-specific weight, $w_i$, is adapted (e.g., incremented or decremented) at block 954, the process returns to block 944.

Returning to decision point 950, if the error is not zero and is not less than the last error value (e.g., is greater than the last value), then the process proceeds to decision point 956. At decision point 956, it is determined if the error is greater than the last value of the error. If the error is greater than the last value of the error, then the process proceeds to block 958.

At block 958, the change that was made to the forwarding class-specific weight, $w_i$, is reverted back to the previous value. For example, if the forwarding class-specific weight, $w_3$, was incremented from 1 to 2 in a previous iteration, then the forwarding class specific-weight, $w_3$, is reverted back to 1 at block 958. Once the forwarding class-specific weight is reverted back to a previous value, the process proceeds to block 944.

Returning to decision point 956, if the error is not greater than the last value of the error, then the process can proceed to further rate shaping, such as the rate shaping described with reference to FIG. 7.

Figure 10:
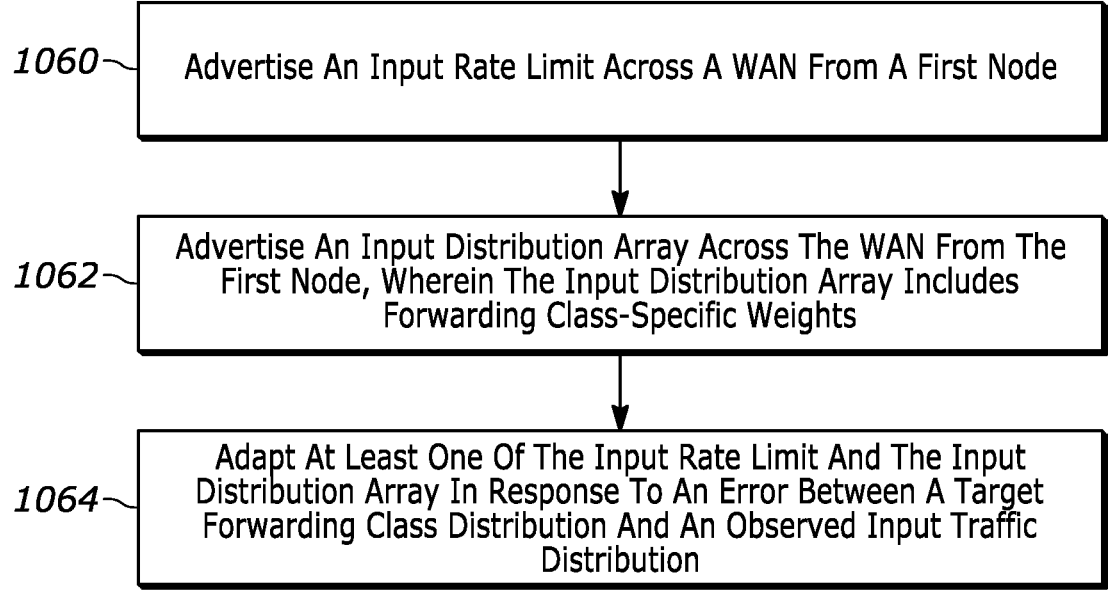
FIG. 10 is another process flow diagram of a method for managing traffic across a WAN.

FIG. 10 is a process flow diagram of a method for managing traffic across a WAN. At block 1060, an input rate limit is advertised across a WAN from a first node. At block 1062, an input distribution array is advertised across the WAN from the first node, wherein the input distribution array includes forwarding class-specific weights. At block 1064, at least one of the input rate limit and the input distribution array is adapted in response to an error between a target forwarding class distribution and an observed input traffic distribution. In addition to adapting at least one of the input rate limit and the input distribution array in response to the error between a target forwarding class distribution and an observed input traffic distribution, the management of traffic across the WAN may further involve rate shaping such as the rate shaping described with reference to FIG. 7.

In the scenarios described above, the receiver node, B1, is able to influence traffic flow through advertisements, e.g., through rate limit and distribution ratio advertisements. However, in other scenarios, some traffic may be received directly from the Internet without passing through the SD-WAN, referred to as "Direct Internet Access" (DIA) traffic and such DIA traffic cannot be influenced through SD-WAN advertisements. In such a case, a hybrid approach to traffic management, which involves monitoring SD-WAN traffic that is received at a receiver node and adapting the policing of DIA traffic at the receiver node in response to the received SD-WAN traffic, may be implemented.

Figure 11:
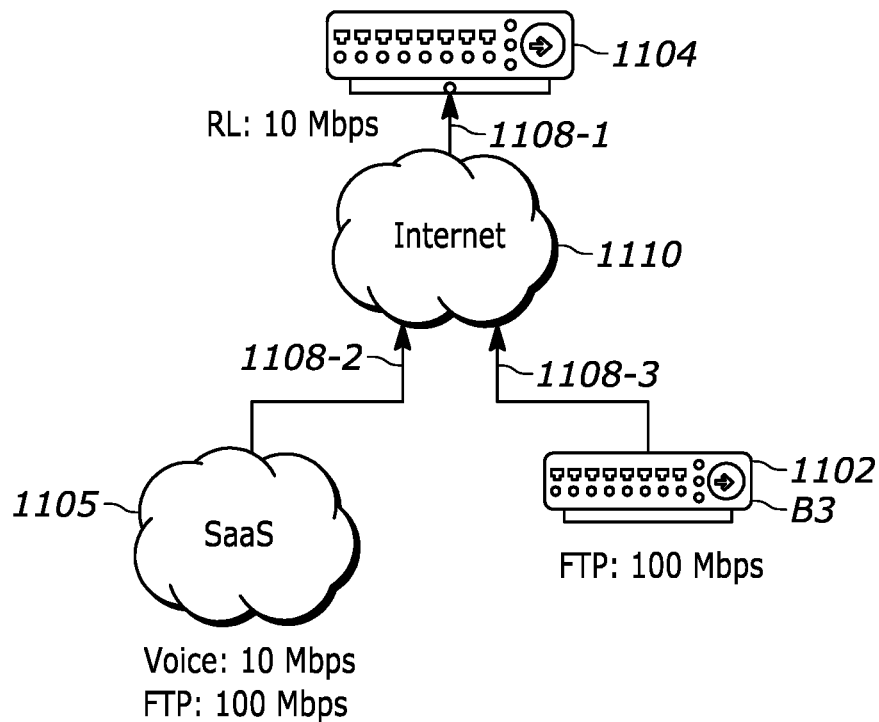
FIG. 11 illustrates a sender node communicatively coupled to a receiver node and a Service (SaaS) via a WAN such as the Internet.

FIG. 11 illustrates a sender node, B3, 1102, communicatively coupled to a receiver node, B1, via a WAN such as the Internet, 1110, and a service, 1105, referred to herein as a "Software as a Service" or "SaaS", which is accessed by the receiver node, B1, via the Internet. In an embodiment, the receiver node, B1, and the sender node, B3, are connected to an SD-WAN as described, for example, with reference to FIG. 1, while the SaaS is connected to the receiver node, B1, through standard IP conductivity. In the example of FIG. 1, the SaaS may be, for example, mail services, office productivity services, voice services, video services, or any other type of cloud service and/or software that is accessed over the Internet. With regard to the receiver node, B1, traffic that is received from an SD-WAN node (e.g., from sender node, B3) via the uplink connections 1108-1 and 1108-3 is referred to as SD-WAN traffic and traffic that is received from a non-SD-WAN node (e.g., a node that is not connected to the WAN controller 106, FIG. 1) via the uplink connections 1108-1 and 1108-2 is referred to as DIA traffic. As described above, traffic that is generated from a node in the SD-WAN can be influenced by SD-WAN advertisements. For example, an SD-WAN messaging protocol can be used to send rate limit and distribution ratio advertisements that influence traffic patterns of SD-WAN nodes. In contrast, SD-WAN nodes are not able to influence traffic patterns from non-SD-WAN nodes with rate limit and distribution advertisements sent as SD-WAN messages. Thus, in the example of FIG. 11, the receiver node, B1, can influence traffic transmitted from sender node, B3, using SD-WAN rate limit and distribution ratio advertisements but such advertisements are not able to influence traffic transmitted from the SaaS. That is, the receiver node, B1, is not able to advertise a specific rate limit to the SaaS the way that it can to the sender node, B3, via the SD-WAN. Although the receiver node, B1, cannot influence the behavior of the SaaS via rate limit and distribution ratio advertisements sent through the SD-WAN, the receiver node, B1, can limit the amount of traffic that is received from the SaaS by locally policing the amount of traffic that is received from the SaaS. For example, if too much DIA traffic is received at the receiver node, B1, the excess traffic can be dropped by the receiver node using a local policer function. In cases in which the dropped traffic utilizes a connection-based protocol (e.g., TCP) versus a connectionless-based protocol (e.g., UDP), the dropping of traffic will typically cause the sender of the dropped traffic to implement a backoff, which will reduce the rate of transmission by the sender, e.g., by the SaaS. Although a backoff reduces the rate of traffic sent by the sender, e.g., by the SaaS, dropping traffic at the receiver node, B1, via policing at the sender node, B1, is not an efficient use of the link bandwidth that is available to the receiver node, B1, since the dropped traffic still consumes link bandwidth in traveling over the link from the Internet to the receiver node. Thus, in an embodiment, a hybrid approach to traffic management involves monitoring SD-WAN traffic that is received at a receiver node and adapting the policing of DIA traffic at the receiver node in response to the rate at which SD-WAN traffic. For example, when the rate of received SD-WAN traffic is below a threshold, more DIA traffic can be received and when the rate of SD-WAN traffic is above a threshold, less DIA traffic is received, which may involve dropping some DIA traffic to trigger a backoff from the source of the DIA traffic.

Figure 12:
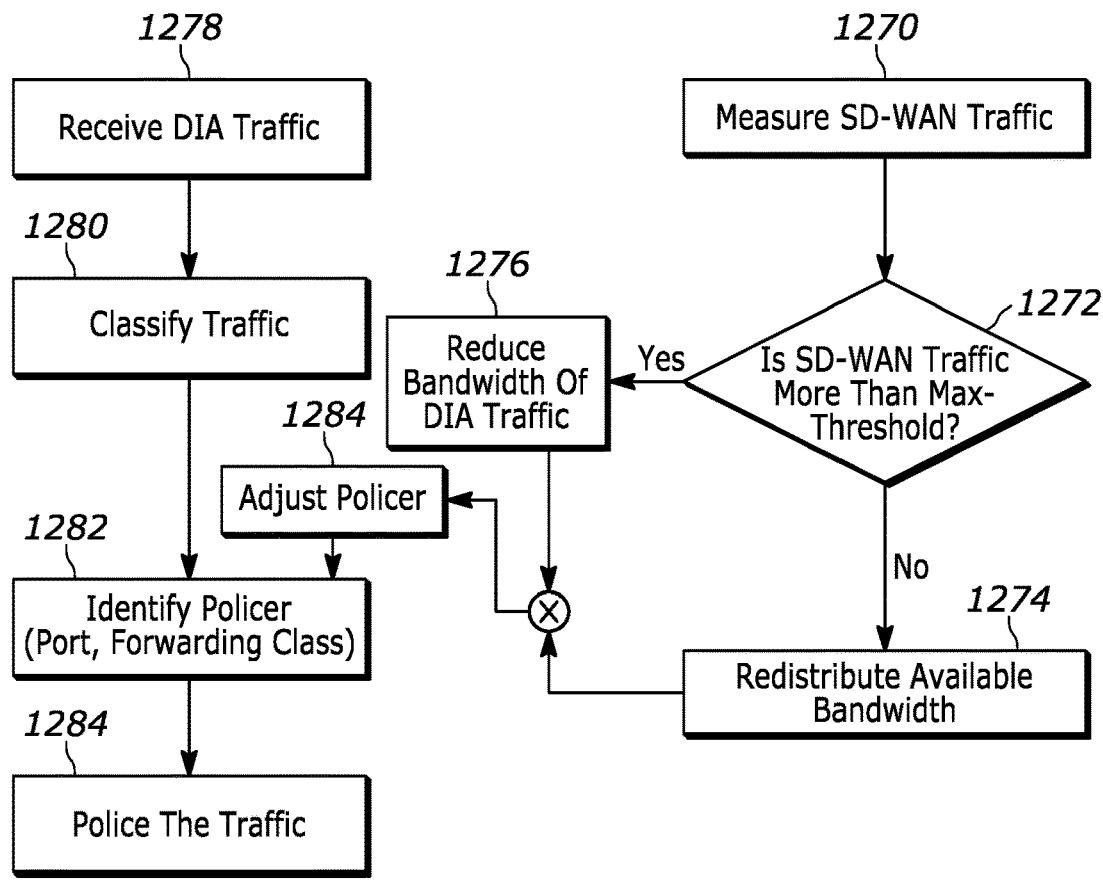
FIG. 12 is a process flow diagram of a technique for managing traffic across a WAN that includes a receiver node of an SD-WAN and at least some sender nodes that are connected by the SD-WAN.

FIG. 12 is a process flow diagram of a technique for managing traffic across a WAN that includes a receiver node of an SD-WAN and at least some sender nodes that are connected by the SD-WAN. For example, the process described with reference to FIG. 12 may be implemented at the receiver node, B1, 1104, as shown in FIG. 11. Processes shown on the right side of FIG. 12 generally relate to SD-WAN traffic (e.g., traffic transmitted from sender node, B3, to receiver node, B1) and processes shown on the left side of FIG. 12 generally relate to DIA traffic (e.g., traffic transmitted from the SaaS to the receiver node via, for example, standard IP connectivity). Starting at block 1270, SD-WAN traffic is monitored. For example, the rate of traffic received from other SD-WAN nodes is monitored at the receiver node, B1. At decision point 1272, it is determined if the rate of received SD-WAN traffic is more than a threshold rate. For example, the receiver node, B1, determines if the monitored rate of SD-WAN traffic received at the node exceeds a threshold rate. If the monitored rate of received SD-WAN traffic does not exceed the threshold rate, then the process proceeds to block 1274. Because the monitored rate of received traffic does not exceed the established threshold rate, it can be assumed that the receiver node has some available bandwidth to receive traffic, e.g., there is some additional bandwidth available on the link between the Internet and the receiver node, B1. At block 1274, bandwidth that is available is redistributed. For example, the available bandwidth on the link and/or at the receiver node, or some portion thereof, is made available for receiving DIA traffic. In an embodiment, the receiver node, B1, can allocate some of its available bandwidth to receiving more DIA traffic. In an embodiment, techniques for redistributing available bandwidth are implemented via a policer at the receiver node, B1. Returning back to decision point 1272, if the monitored rate of received SD-WAN traffic does not exceed the threshold rate, then the process proceeds to block 1276. At block 1276, the amount of bandwidth available for receiving DIA traffic is to be reduced. For example, the amount of bandwidth allocated by the receiver node, B1, to receiving DIA traffic is reduced by adjusting the policer at the receiver node, B1, to reduce the amount of traffic that is received. In an embodiment, policing excess traffic involves dropping DIA traffic that exceeds a DIA traffic threshold rate. In an embodiment, techniques for reducing the amount of DIA traffic that is received at the receiver node, B1, are implemented via a policer at the receiver node, B1. In an embodiment, the policer may be adjusted on a per-port and per-forwarding class basis.

Moving to the left side of FIG. 12, at block 1278, DIA traffic is received, e.g., DIA traffic is received at the receiver node, B1. At block 1280, the received DIA traffic is classified. For example, traffic received at the receiver node, B1, is classified as DIA traffic based on any Layer 2(L2)-Layer 7(L7) parameters, including, IP addresses, port, protocol header values, application types, and source users. In an embodiment, received packets are further classified into one of 16 different forwarding classes. At block 1282, a policer is identified for the traffic. In an embodiment, policers are identified for received as a function of the forwarding class into which a packet has been classified.

Additionally, at block 1284, the identified policer may have been adjusted. For example, the policer may have been adjusted to allow more DIA traffic to be received (e.g., to redistribute some of the bandwidth that was reserved for SD-WAN traffic, block 1274) or the policer may have been adjusted to reduce the amount of traffic that is received (e.g., to reduce the bandwidth of DIA traffic, block 1276). For example, if the total uplink bandwidth is 50 Mbps and SD-WAN traffic is allocated a guaranteed uplink bandwidth of 30 Mbps, then the DIA traffic is able to consume the remaining 20 Mbps. If, however, only 10 Mbps of SD-WAN traffic is being received, the policer can be adjusted to increase the bandwidth available to DIA traffic from 20 Mbps to 40 Mbps.

Once the appropriate policer is identified, at block 1284, the corresponding traffic is policed. For example, the corresponding traffic may be passed up to higher layers in the stack of receiver node, B1, if a policing limit has not been exceeded or the corresponding traffic may be dropped if the policing limit has been exceeded. In an embodiment, received DIA traffic is classified into forwarding classes and class-specific policing can be applied to the different forwarding classes. For example, different policing weights could be applied to different forwarding classes.

Figure 13:
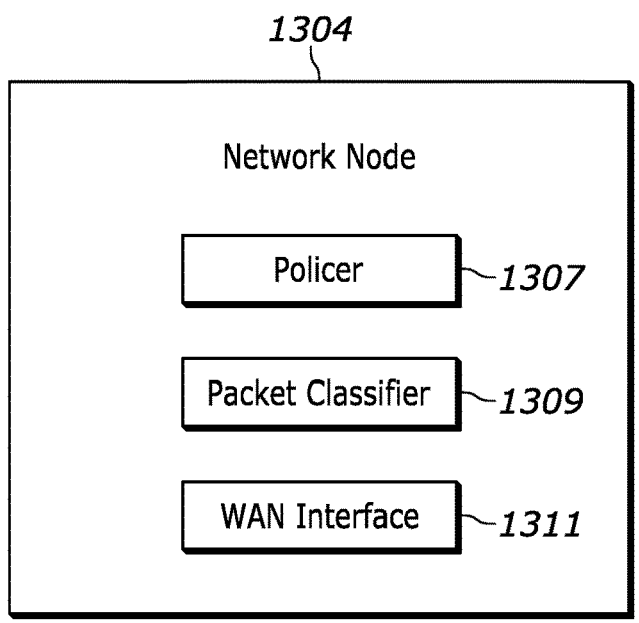
FIG. 13 depicts elements of a node, such as a receiver node, which includes a policer, a packet classifier, and a WAN interface.

FIG. 13 depicts elements of a node 1304, such as the receiver node, B1, which includes a policer 1307, a packet classifier 1309, and a WAN interface 1311. In an embodiment, the policer is configured to policer incoming traffic. For example, the policer is configured to police the incoming traffic on a per-port and/or a per-forwarding class basis. The policer may police based on other criteria. In an embodiment, the packet classifier is configured to classify traffic incoming to the receiver node. For example, the classifier may classify incoming traffic based on any combination of L2-L7 parameters. Traffic may also be classified based on the port and/or interface upon which the traffic is received.

The WAN interface is configured to receive traffic communicated via a network interface. The network interface may include a wired interface and/or a wireless interface as is known in the field. In an embodiment, the node is configured to implement the process described with reference to FIG. 12.

Figure 14:
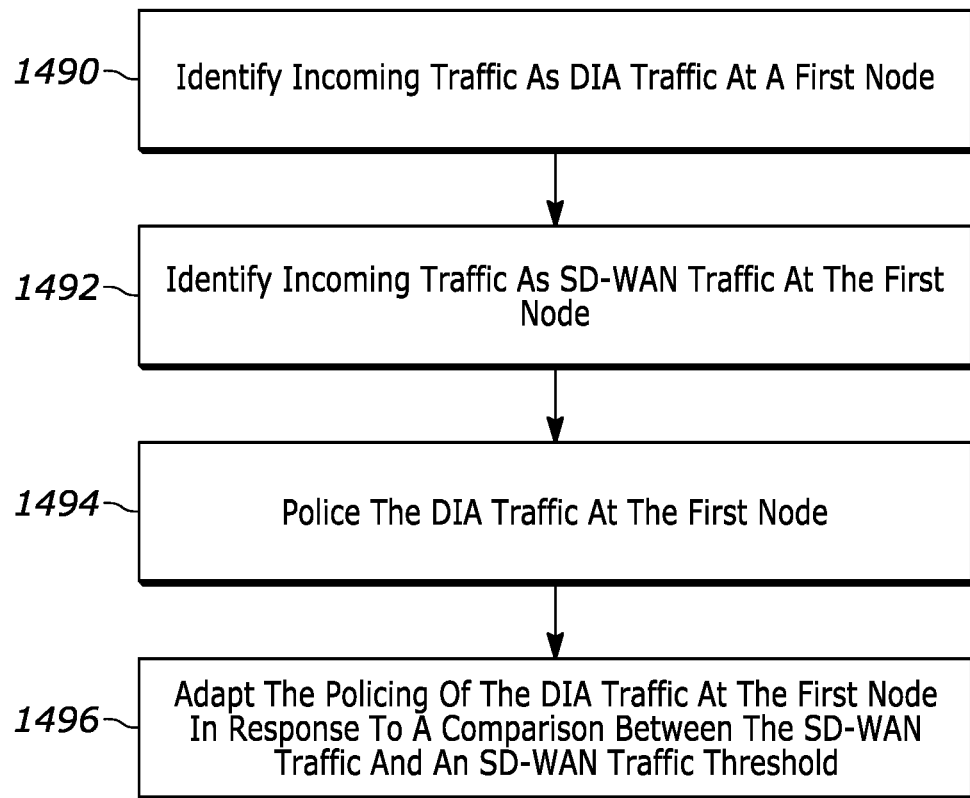
FIG. 14 is a process flow diagram of a method for managing traffic across a WAN.

FIG. 14 is a process flow diagram of a method for managing traffic across a WAN. At block 1490, received/incoming traffic is identified as DIA traffic at a first node. At block 1492, received/incoming traffic is identified as SD-WAN traffic at the first node. At block X, the DIA traffic is policed at the first node. At block 1496, the policing of the DIA traffic at the first node is adapted in response to a comparison between the SD-WAN traffic and an SD-WAN traffic threshold. In an embodiment, the policing of DIA traffic may be implemented on a per-forwarding class basis. The process described with reference to FIG. 14 is similar to the process described above with reference to FIGS. 11-13.

Figure 15:
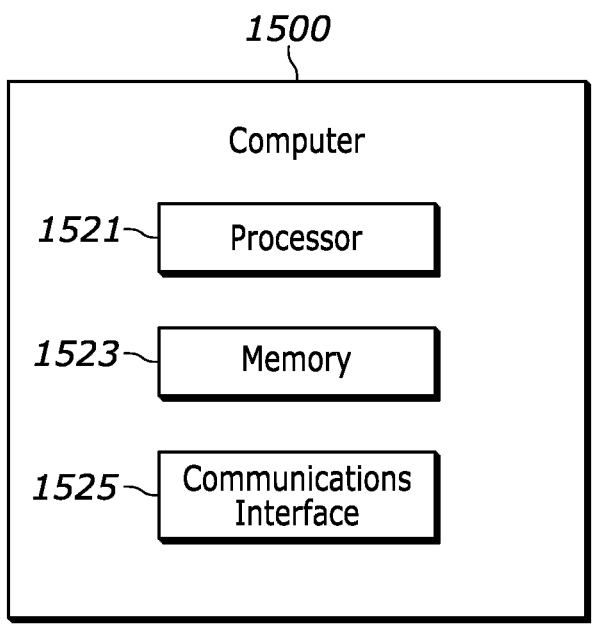
FIG. 15 is a block diagram of a computer.

FIG. 15 is a block diagram of a computer 1500 that includes a processor 1521, memory 1523, and a communications interface 1525. The processor may include a multi-function processor and/or an application-specific processor. Examples of processors include the PowerPC™ family of processors by IBM and the x86 family of processors by Intel. The memory within the computer may include, for example, a non-transitory storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer-readable storage medium for execution by a computer. As an example, an embodiment of a non-transitory computer-readable storage medium includes a computer useable storage medium configured to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing traffic across a wide area network (WAN), the method comprising:
advertising an input rate limit across a WAN from a first node;
advertising an input distribution array across the WAN from the first node, wherein the input distribution array includes forwarding class-specific weights; and
adapting at least one of the input rate limit and the input distribution array in response to an error between a target forwarding class distribution and an observed input traffic distribution;
wherein adapting the input distribution array involves calculating an error as:
E=RMSE(Wn, Dn),
where,
i=integer set of forwarding classes with i being an integer greater than 1,
a normalized array of weights, Wn=$w_0$/max(W); . . . $w_i$/max(W), where max(W) is the highest weight, w, amongst the weights of the set of forwarding classes, and
a normalized traffic distribution, Dn=$r_0$/max(R), . . . $r_i$max(R), where max(R) is the highest rate, r, amongst the rates of the set of forwarding classes.

2. The method of claim 1, wherein adapting the input distribution array involves incrementing a forwarding class-specific weight of the input distribution array.

3. The method of claim 1, wherein adapting the input distribution array involves decrementing a forwarding class-specific weight of the input distribution array.

4. The method of claim 1, further comprising identifying the forwarding class with the highest individual error and adapting the corresponding forwarding class-weight.

5. The method of claim 4, wherein the corresponding forwarding class-weight is incremented.

6. The method of claim 4, wherein the corresponding forwarding class-weight is incremented by 1.

7. The method of claim 4, wherein the corresponding forwarding class-weight is decremented.

8. The method of claim 4, wherein the corresponding forwarding class-weight is decremented by 1.

9. The method of claim 1, if the error is higher than the previous iteration, reverting the forwarding class-weight to the previous value.

10. The method of claim 1, further comprising identifying the forwarding class with the highest individual error and adapting the corresponding forwarding class-weight.

11. The method of claim 1, wherein adapting the input distribution array involves decrementing a forwarding class-specific weight of the input distribution array.

12. The method of claim 1, wherein adapting the input distribution array involves ordering a normalized traffic distribution, Dn, by individual error and adapting the forwarding class-weight with the greatest error.

13. The method of claim 1, wherein adapting the input distribution array involves calculating an error as:

$$E = \left( \frac{\sqrt{(w_0 - d_0)^2} + \sqrt{(w_1 - d_i)^2} + \sqrt{(w_2 - d_2)^2} + \sqrt{(w_3 - d_3)^2} \ldots \sqrt{(w_i - d_i)^2}}{i+1} \right);$$

where $w_i$ is the forwarding class-specific normalized weight and $d_i$ is the forwarding class-specific normalized input traffic distribution, where i is an integer set of forwarding classes with i being an integer greater than 1.

14. The method of claim 13, further comprising identifying the forwarding class with the highest individual error and adapting the corresponding forwarding class-weight.

15. The method of claim 14, wherein the corresponding forwarding class-weight is incremented.

16. The method of claim 14, wherein the corresponding forwarding class-weight is decremented.

17. A computing device for shaping traffic across a wide area network, the computing device comprising a memory and processor, the memory comprising instructions that, when executed by the processor, cause the processor to perform steps comprising:
   advertising an input rate limit across a WAN from a first node;
   advertising an input distribution array across the WAN from the first node, wherein the input distribution array includes forwarding class-specific weights; and
   adapting at least one of the input rate limit and the input distribution array in response to an error between a target forwarding class distribution and an observed input traffic distribution;
   wherein adapting the input distribution array involves calculating an error as:
   E=RMSE(Wn, Dn),
   where,
   i=integer set of forwarding classes with i being an integer greater than 1,
   a normalized array of weights, Wn=$w_0$/max(W); . . . $w_i$/max(W), where max(W) is the highest weight, w, amongst the weights of the set of forwarding classes, and
   a normalized traffic distribution, Dn=$r_0$/max(R), . . . $r_i$/max(R), where max(R) is the highest rate, r, amongst the rates of the set of forwarding classes.

18. A computer readable storage medium that stores computer readable instructions, which when executed by a processor, cause the processor to perform steps comprising:
   advertising an input rate limit across a WAN from a first node;
   advertising an input distribution array across the WAN from the first node, wherein the input distribution array includes forwarding class-specific weights; and
   adapting at least one of the input rate limit and the input distribution array in response to an error between a target forwarding class distribution and an observed input traffic distribution;
   wherein adapting the input distribution array involves calculating an error as:
   E=RMSE (Wn, Dn),
   where,
   i=integer set of forwarding classes with i being an integer greater than 1,
   a normalized array of weights, Wn=$w_0$/max(W); . . . $w_i$/max(W), where max(W) is the highest weight, w, amongst the weights of the set of forwarding classes, and
   a normalized traffic distribution, Dn=$r_0$/max(R), . . . $r_i$/max(R), where max(R) is the highest rate, r, amongst the rates of the set of forwarding classes.

19. A method for managing traffic across a wide area network (WAN), the method comprising:
   advertising an input rate limit across a WAN from a first node;
   advertising an input distribution array across the WAN from the first node, wherein the input distribution array includes forwarding class-specific weights; and
   adapting at least one of the input rate limit and the input distribution array in response to an error between a target forwarding class distribution and an observed input traffic distribution;
   wherein adapting the input distribution array involves ordering a normalized traffic distribution, Dn, by individual error and adapting the forwarding class-weight with the greatest error.

20. A method for managing traffic across a wide area network (WAN), the method comprising:
   advertising an input rate limit across a WAN from a first node;
   advertising an input distribution array across the WAN from the first node, wherein the input distribution array includes forwarding class-specific weights; and
   adapting at least one of the input rate limit and the input distribution array in response to an error between a target forwarding class distribution and an observed input traffic distribution;
   wherein adapting the input distribution array involves calculating an error as:

$$E = \left( \frac{\sqrt{(w_0 - d_0)^2} + \sqrt{(w_1 - d_i)^2} + \sqrt{(w_2 - d_2)^2} + \sqrt{(w_3 - d_3)^2} \ldots \sqrt{(w_i - d_i)^2}}{i+1} \right);$$

where $w_i$ is the forwarding class-specific normalized weight and $d_i$ is the forwarding class-specific normalized input traffic distribution, where i is an integer set of forwarding classes with i being an integer greater than 1.

* * * * *